United States Patent [19]

Montillier

[11] 4,157,973
[45] Jun. 12, 1979

[54] COPOLYMER COMPOSITIONS AND METHOD OF PREPARATION

[75] Inventor: Jean P. Montillier, Trumbull, Conn.

[73] Assignee: Pitney-Bowes, Inc., Stamford, Conn.

[21] Appl. No.: 667,250

[22] Filed: Mar. 15, 1976

Related U.S. Application Data

[60] Continuation of Ser. No. 470,090, May 15, 1974, abandoned, which is a division of Ser. No. 396,447, Sep. 12, 1973, Pat. No. 3,860,552.

[51] Int. Cl.$^2$ ............................................. G03G 9/12
[52] U.S. Cl. ........................ 252/62.1 L; 260/33.6 UA
[58] Field of Search ................................. 252/62.1 L; 260/33.6 UA, 86.1 R, 86.1 E

[56] References Cited

U.S. PATENT DOCUMENTS

| | | | |
|---|---|---|---|
| 3,397,166 | 8/1968 | Schmiole et al. | 260/33.6 UA |
| 3,411,936 | 11/1968 | Roteman et al. | 252/62.1 X |
| 3,585,140 | 6/1971 | Machida et al. | 252/62.1 |
| 3,640,751 | 2/1972 | Kasuya et al. | 252/62.1 X |
| 3,654,201 | 4/1972 | Mansour et al. | 260/33.6 UA X |
| 3,668,127 | 6/1972 | Machida et al. | 260/33.6 UA X |
| 3,671,646 | 6/1972 | Kurita et al. | 252/62.1 |
| 3,753,760 | 8/1973 | Kosel | 252/62.1 X |

Primary Examiner—Roland E. Martin, Jr.
Attorney, Agent, or Firm—Peter Vrahotes; William D. Soltow, Jr.; Albert W. Scribner

[57] ABSTRACT

Disclosed herein are novel copolymer compositions and method of preparing same that are useful for coating applications and as toners in the electrostatic printing industry. These copolymer compositions of the present invention are prepared by copolymerization of, on the one hand a low molecular weight unsaturated ester which is called a first monomer and on the other hand one or more copolymerizable long chain, $C_6$ to $C_{20}$ aliphatic ethylenically unsaturated monomers which is called a second monomer in a non-aqueous solvent, for example, isoparaffinic hydrocarbons.

4 Claims, No Drawings

COPOLYMER COMPOSITIONS AND METHOD OF PREPARATION

This is a continuation, division of application Ser. No. 470,090 filed May 15, 1974, now abandoned; which is a division of Ser. No. 396,447, now U.S. Pat. No. 3,860,552.

BACKGROUND OF THE INVENTION

This invention relates to novel copolymer compositions, method of preparing same, non-aqueous coating compositions and compositions in a non-aqueous system which are useful as liquid toners for electrophotography. More particularly, this invention relates to copolymer compositions prepared by copolymerization of low molecular weight esters such as vinyl esters and long chain, $C_6$ to $C_{20}$ aliphatic ethylenically unsaturated esters in an isoparaffinic hydrocarbon solvent.

The use of liquid developers for electrophotography, i.e., rendering visible as a permanent image a latent image consisting of a pattern of electrostatic charges, is well known. The use of liquid toners over the dry method of developing such a pattern of charges has advantages such as, for example, sharper and better defined images, images having a higher degree of economical use of the developer, a faster developing cycle, and simpler less expensive and more trouble free developing equipment. However, although the industry strongly desires an excellent liquid toner, those which presently are available are subject to various deficiencies. For example, the liquid toners heretofore available have not given sufficiently good resolution or sufficiently dense or sharp images. In addition, with many liquid toners there has been a serious complaint that shelf life was not long enough in that some of the solids suspended within the liquid toner tended to settle and agglomerate too quickly making it necessary to redisperse them prior to use. This is especially true with respect to pigment containing liquid toners.

In addition to the toner problems described above, conventional electrophotography has a disadvantage of giving copies which lack the feel and look of plain bond paper and lack the contrast of offset printed material. However there is a trend today towards the development of so-called copier/duplicators which combine in one machine the advantages of both electrophotography and offset printing. In such machines a lithographic plate is prepared by an electrophotographic process in which a photoconductor coated substrate is charged in the dark, exposed to an original image, toned with a so-called lithographic toner and subsequently chemically treated to render the image areas oleophilic and hydrophobic and the non-image areas hydrophilic and oleophobic as is normally done in any offset process. It is therefore possible by the use of such copier/duplicator machines to generate offset quality copies by an electrophotographic process.

The major requirement in such copier/duplicator machines is the lithographic toner that is to be used.

SUMMARY OF THE INVENTION

The object of the present invention is to provide novel copolymers compositions and a novel method of preparing same.

A further object of the present invention is to provide a liquid electrophotographic developer composition which overcomes the aforesaid deficiencies and drawbacks and which produces an improved developed electrostatic image.

Another object of the present invention is to provide a liquid electrophotographic developer composition that is free of pigment therein.

A further object of the present invention is to provide a novel electrophotographic developer composition that is oleophilic and hydrophobic, has strong adhesion to photoconductive paper, excellent charge holding characteristics, resistance to etching solutions, excellent fill-in capability and stability.

A liquid development process, for the development of latent electrostatic images is disclosed by R. W. Gundlach in U.S. Pat. No. 3,084,043. While a number of liquid development systems have been disclosed many disadvantages have been present therein and these liquid development systems can be improved in many areas. Conventional pigmented liquid development toners do not perform satisfactorily in offset electrophotography because of lack of adhesion, poor stability, poor resistance to etching solutions, poor oleophilicity and lack of acceptable fill-in ability.

The liquid toner composition of the present invention overcomes all of the above objections to the presently available liquid toners as described above and may be utilized in both regular electrophotography that is so-called Electrofax, or offset electrophotography. However, it must be noted that the liquid toner of this invention is not limited in its use in offset electrophotography, and it can be used for electrographic printing, high speed printing, ink jet printing, microfilm reproduction, facsimile printing, instruments recordings, etc.

The following Table I illustrates the comparison in the requirement of regular electrophotography and offset electrophotography.

TABLE I

| Regular Electrophotography | Offset Electrophotography |
|---|---|
| Paper | |
| Paper must be white | No color requirement |
| Limitation of the amount of sensitizing dyes (low speed $t\frac{1}{2}$* = 1.5–2.3 foot candle second) | Paper can be heavily sensitized (high speed $t\frac{1}{2}$* = 1.2–1.5 foot candle second) |
| Liquid toner | |
| Must be based on black pigment in order to obtain black and white copies | No need for pigments (toned paper is used as master for lithography) |
| Good adhesion to substrate | Good adhesion to substrate |
| Good stability | Good stability |
| Good charge holding characteristics | Good charge holding characteristics |
| No toxicity | No toxicity |
| | Resistance to etching solutions |
| | Oleophilicity and hydrophobicity |

*$t\frac{1}{2}$: time of exposure to a 1 foot candle light source in order to decrease the acceptance voltage by half.

An additional advantage of the liquid development toner of the present invention is that it can be used in conjunction with zinc oxide as the photoconductor. It is therefore a considerable saving and advantage to be able to produce copies of much superior quality to conventional Xerox and Electrofax copies, by using the cheapest photoconductor (ZnO) in combination with the toner of this invention.

On the other hand, the use of conventional pigmented liquid development toners have led to the obtaining of copies of poor quality or non-acceptability and therefore would not be useful in offset printing.

Based on the requirements for an acceptable liquid development toner for offset electrophotography, as described above, the toner based on the novel copolymer compositions of the present invention have been developed.

In order to prepare the novel compositions of the present invention, having all of the desirable characteristics as set forth above, it has been found that non-aqueous dispersion of specific polymeric materials in a suitable organic liquid carrier such as a petroleum fraction have said desired characteristics.

The organic liquid carrier is, as mentioned above, a petroleum fraction, it having been discovered that this particular class of carriers is uniquely capable of effecting the present invention by virtue of the following attributes: (a) quick evaporation, e.g., a thin film of the carrier will evaporate in a few seconds at a temperature below the char point of paper, so as to permit fast drying; (b) non-toxicity; (c) low odor; (d) sufficient fluidity to allow the dispersed particles to migrate therethrough with ease so that they are capable of being quickly electrostatically attracted to and coupled with the pattern of electrostatic charges which is to be developed; (e) not attacking the binder or other ingredients of the photoconductive coating on the lithographic master; (f) not bleeding the electrostatic charges before the particle is deposited so as to maintain any desired degree of contrast; and (g) inexpensiveness.

In order to obtain these beneficial attributes, the petroleum fraction, i.e., paraffinic solvent, should have an evaporation rate at least as fast as that of kerosene, but slower than that of hexane. Thereby, the evaporation of the liquid from a film will be rapid, e.g., two seconds, or less, at a temperature slightly below the char point of paper, it being customary to raise the temperature of the film of liquid developer to this level for the purpose of evaporating the developer after the electroscopic particles of the toner have been deposited by attraction on the electrostatically charged pattern. The petroleum fraction should have a low K.B. (Kauri-butanol) number, to wit, less than 30, and preferably between 25 and 30. This low K.B. number minimizes the possibility that the petroleum fraction will attack the coating binder, e.g., the binder for the zinc oxide, or will attack or dissolve the dispersed copolymer particles of the toner. The petroleum fraction also should be substantially free of aromatic liquid constituents, i.e., it should be substantially aromatic-liquid-free. This term as used herein, connotes that the proportion of aromatic liquids in the organic liquid carrier should not be in excess of two percent by weight. The aromatic liquids have a strong tendency to attack the coating binders, e.g. the coating binders for zinc oxide, but in concentrations of less than two percent this tendency is so negligible as to be unnoticeable. The petroleum fraction must have a high electrical resistivity, e.g., in the order of at least $10^9$ ohm centimeters, and a dielectric constant of less than 3.5 so that the liquid carrier will not dissipate the pattern of electrostatic charges which are to be developed. The TCC (Tagliabue closed cup) flash point of the liquid carrier should be at least 100° F. (38° C.) whereby under the conditions of use the liquid is considered non-flammable. The paraffinic solvent also is non-toxic. It possesses no objectionable odor and preferably is odor-free, this being denoted by the term "low odor." Consonant with its low dielectric constant and high resistivity, the liquid carrier is non-polar. The petroleum fractions have two other advantages of low viscosity and inexpensiveness.

Examples of petroleum fraction organic liquid carriers having physical characteristics which fall within the foregoing criteria are Isopar G manufactured by Exxon Corporation and Soltrol 100 manufactured by Phillips Petroleum.

The monomeric materials to be dispersion copolymerized in the aliphatic hydrocarbon solvent according to the present invention are, on one hand, as a so-called first monomer, a low molecular weight unsaturated ester such as vinyl acetate and on the other hand or so-called second monomer, one or more long chain $C_6$ to $C_{20}$ aliphatic ethylenically unsaturated ester such as lauryl methacrylate. Additional low molecular weight monomers that may be employed in the composition and process of the present invention are vinyl esters such as vinyl acetate, vinyl propionate, esters of acrylic or methacrylic acid such as methyl, ethyl, propyl esters of acrylic or methacrylic acids.

Examples of long chain monomers are long chain esters of acrylic, or methacrylic acid, e.g., stearyl, lauryl, octyl, 2-ethyl hexyl and hexyl esters of acrylic or methacrylic acid; vinyl esters of long chain acids, e.g., vinyl laurate, vinyl stearate; vinyl alkyl ethers; ethylene, propylene, butadiene and isoprene; long chain fatty acids and hydroxyl-containing long chain fatty acids.

Any polymerization pressure can be employed in the processes of the present invention. Thus, pressures from atmospheric to 1000 psi or higher can be employed. Atmospheric pressure is, of course, preferred. The polymerization temperature is chosen as a function of the catalyst used and can vary between 60° C. and 150° C., but will preferably be between 80°-100° C. in order to avoid decomposition or degradation of the dispersed polymer.

The selection of the desired catalyst is merely a matter of choice. Any suitable polymerization catalyst may be used such as the organic peroxides, the one found most preferable being benzoyl peroxide.

The reaction time should be sufficient to produce the copolymeric material within the desired molecular weight range which is between 80,000 and 500,000. Typically reaction times will vary from a few hours at 120° C. to one day at 80° C.

The proportion of the first monomer to the second monomer to form the copolymer dispersion in the aliphatic hydrocarbon solvent can vary over a wide range but generally from about 95 to 5% to 50 to 50% by weight and preferably from 90 to 10% to about 70 to 30% by weight. The selection of the proportion will depend on the desired end use of the novel composition of the present invention. For example, in lithographic applications the desired range of proportions would be from about 95 to 5% to about 75 to 25% by weight whereas for coating applications the proportion range would be from about 25% to 75% to 95 to 5% by weight.

One of the more advantageous features of the compositions and process of the present invention is that there is no need for a pre-synthesized dispersing agent such as those described in U.S. Pat. Nos. 3,095,388; 3,317,635; 3,393,162; 3,399,164; 3,419,515; 3,433,753; 3,514,500; 3,519,701; 3,625,914; 3,645,959; 3,669,859; 3,686,114; 3,691,123; 3,701,747 and 3,702,836. This reduces the cost and the time necessary to produce the compositions of the present invention.

The preferred process for obtaining the copolymer dispersion of the present invention is by controlled dispersion copolymerization in which the first monomer to be dispersion copolymerized, preferably vinyl acetate, is mixed with one or more monomers which will have the ability to enhance the solvation of the main polymer in the solvent system, preferably lauryl methacrylate, at a vinyl acetate-lauryl methacrylate ratio of about 80 to 20 in an aliphatic hydrocarbon, preferably Isopar G, at a temperature of about 85° C. for a period of about six hours at atmospheric pressure.

The reaction product of the dispersion copolymerization of vinyl acetate and lauryl methacrylate comprises the copolymer and the aliphatic hydrocarbon solvent and can be used directly as a coating composition or as a toner for offset electrophotography. It should be noted that although not necessary, additives such as driers and coloring pigments in coating applications may be added and charge directors and pigments to give coloration may be added in the lithographic applications.

While it is not necessary with the electrostatic liquid toner composition of the present invention it might be desirable, for increased contrast, to include in the toner composition a surface active agent also known as a charge director.

The charge directors, which are per se well known in the field of electrophotographic liquid toners, must be soluble or dispersible in the paraffinic solvent and must create or augment an electrostatic charge on the submicron dispersed particles. Examples of usable charge directors pursuant to this invention are aluminum stearate; cobalt salt of 2-ethyl hexanoic acid; iron salt of 2-ethyl hexanoic acid; manganese salt of 2-ethyl hexanoic acid; zirconium salt of 2-ethyl hexanoic acid; manganese linoleate; metal salts consisting of naphthenic acid and metals such as manganese, cobalt, nickel, zinc, chromium, magnesium, lead, iron, zirconium, calcium and aluminum.

The desirable amount of such a charge director dissolved is the carrier liquid consisting of said hydrocarbon is in the range of from 0.01 g to 1 g per 1000 g of the carrier liquid.

Since these surface active agents act as driers it may also be desirable to utilize them in the coating compositions of the present invention.

Pigments or coloring agents may be added, if desired, to either the coating compositions or the electrostatic liquid toners of the present invention. Organic or inorganic pigments or coloring agents are suitable. For example, carbon black, aniline black, cyanine black, spirit black, benzidine orange, benzidine yellow, methylene blue, alkali blue, cyanine blue, phthalocyanine green etc. are applicable.

The proportion of the copolymer in the aliphatic hydrocarbon can vary over a wide range depending on whether it is to be used for coating applications or for toner applications. The amount of copolymer in the coating composition can vary from about 0.1 to 70% by weight. The amount of copolymer in the toner composition can vary from about 0.1 to about 5% by weight.

Having described the basic concepts of the present invention, illustration will now be made by reference to the following examples which are given by way of illustration, but not by way of limitation.

EXAMPLE I

A non-aqueous polymeric dispersion is prepared according to the prior art, that is by use of a pre-synthesized polymeric dispersing agent. A typical dispersing agent is the one described in U.S. Pat. No. 3,317,635 to Desmond Wilfrid John Osmond, assignor to Imperial Chemical Industries, column 12, example 3. The dispersing agent is a terpolymer 97/3/1.5 of lauryl methacrylate, alycidyl methacrylate and methacrylic acid, which is prepared as a 30% solution in an aliphatic hydrocarbon boiling between 110°–150° C.

A mixture of 1250 ml of Isopar G (isoparaffinic solvent with a boiling range 158° C.–176° C.) and 105 g of the solution of the polymeric dispersant described above was heated to 85° C. in a vessel fitted with a stirrer, a reflux condenser, and a thermometer. A mixture of 1.25 g of benzoyl peroxide and 387.5 g of vinyl acetate is then added at once, while maintaining the temperature at 85°–90° C. When polymerization starts taking place, cloudiness of the formulation appears. Two hours after appearance of cloudiness a mixture of 105 g of solution of polymeric dispersant, 387.5 g of vinyl acetate and 1.25 g of benzoyl peroxide is added over one hour period. The temperature of the dispersion is maintained at 85°–90° C. for the next six hours.

Upon cooling, a 42% by weight, low viscosity, dispersion is formed which shows slight settling after a few days.

This dispersion can be used for coating purposes and can be diluted as desired with some isoparaffinic solvent. It has good adhesion to various substrates giving smooth clear coatings.

When diluted to a 1% by weight concentration with Isopar G, the dispersion can be used as a litho-toner for offset electrophotography. However, for best results, it is necessary to add 5–10 g of 50% solution in mineral oil of zirconium octoate per liter of dispersion. In these conditions, toned litho-masters can be used to prepare offset copies of excellent quality. However, it was found that in some cases, after several months on the shelf some dispersions of this type had a tendency to settle out.

EXAMPLE II

The non-aqueous dispersions of this invention are prepared in a much simpler manner without use of a pre-synthesized dispersing agent. The only equipment required consists of a vessel fitted with a reflux condenser, a stirrer and a thermometer. In a typical example, in order to produce a low viscosity 40–45% non-aqueous polymeric dispersion, the following ingredients are placed in the reaction vessel, stirred, and heated to 90° C. for twelve hours:

| | | |
|---|---|---|
| Isopar G | 100 ml | |
| Benzoyl peroxide | 0.2 g | |
| Vinyl acetate | 42.5 g | } 85/15 ratio |
| Lauryl methacrylate | 7.5 g | |

Once cooled, the resulting dispersion can be successfully used for coating applications and produces hard clear coatings, with good adhesion to various substrates such as paper, aluminum, glass, etc.

The low viscosity 40% dispersion can be diluted with any hydrocarbon type solvent, such as Isopar G. One percent dispersions performed very well as litho-toners in offset electrophotography. Used to tone or develop electrostatic images on zinc oxide coated papers, the litho-toners of this invention showed excellent adhesion to the substrate (zinc oxide-binder system), excellent oleophilicity and hydrophobicity, excellent resistance to etching solutions and abrasion and excellent stability even after several months of storage.

EXAMPLE III

Example II was repeated except that an 80/20 ratio vinyl acetate, lauryl methacrylate was used. An excellent non-aqueous dispersion could be prepared. It was diluted to 1% with Isopar G and added 2.5 g of a 50% solution of zirconium octoate as a charge director, per liter of dispersion. It worked very well as a litho-toner, giving excellent offset copies, with no problem of settling even after six months of storage.

EXAMPLE IV

Example II was repeated with 75/25 ratio of vinyl acetate to lauryl methacrylate. In this case too a very stable polymeric dispersion was formed with a low viscosity which could be used as well for coating applications as litho-toner applications.

EXAMPLE V

Example II was repeated with a 50/50 ratio of vinyl acetate and lauryl methacrylate. At this level of lauryl methacrylate, a slightly more viscous dispersion is formed which can be successfully used for coatings and adhesive applications.

EXAMPLE VI

Example II was repeated with a 28/72 ratio of vinyl acetate and lauryl methacrylate. At this level of lauryl methacrylate, a hazy solution, of low viscosity is formed which can be used for adhesive applications, with excellent bonding characteristics to polyethylene or aluminum.

EXAMPLES VII, VIII, IX

Example II was repeated except that lauryl methacrylate was replaced by stearyl methacrylate.

The following ratios of vinyl acetate and stearyl methacrylate were successfully used to form stable non-aqueous dispersions: 90/10; 85/15; 80/20.

These dispersions could be used for coating applications where thin, clear coatings adhering well to various substrates such as glass, paper, foil etc. are necessary.

The dispersions could be diluted at will with various hydrocarbon solvents without any effect on the stability of the dispersion.

One percent by weight dispersions prepared by dilution of the 40% concentrate with Isopar G were used as litho-toners in offset electrophotography. The quality of the copies generated was excellent even without the addition of small amounts of charge directors.

Such litho-toners have excellent adhesion to the photoconductor coated paper, excellent oleophilicity and hydrophobicity, excellent resistance to etching solutions, excellent stability and excellent charge holding characteristics.

EXAMPLE X

Example II was repeated except that lauryl methacrylate was replaced by 2-ethyl hexyl acrylate, with a 75/25 ratio of vinyl acetate to 2-ethyl hexyl acrylate. A very stable, low viscosity dispersion was formed which had application for coatings or adhesives purposes. This dispersion could be diluted without any loss of long-term stability. However, for litho-toner applications, this dispersion was not as desirable being somewhat more sensitive to etching solutions.

EXAMPLE XI

Example X was repeated with a 50/50 ratio vinyl acetate, 2-ethyl hexyl acrylate. A rather viscous, stable dispersion was formed which could be used in adhesive applications.

When using higher amounts of 2-ethyl hexyl acrylate the polymers become completely soluble in the hydrocarbon solvent.

EXAMPLE XII

Using the same equipment as described in the example II, the following compounds were mixed, stirred and heated at 100° C. for five hours:

| | |
|---|---|
| Isopar G | 300 ml. |
| Benzoyl peroxide | 0.4 g |
| Methyl methacrylate | 80 g }  80/20 ratio |
| Lauryl methacrylate | 20 g |

However, a lot of polymer settled out of the dispersion while only 4–5% stayed in a stable dispersion form. Such a dispersion can be further diluted and used as a litho-toner. However, its adhesion to zinc oxide coated paper is insufficient and unless used at high temperature, it is not as suitable as a litho-toner.

EXAMPLE XIII

Example XII was repeated except that methyl methacrylate was replaced by ethyl acrylate, with an 80/20 ethyl acrylatelauryl methacrylate ratio. In this case the copolymer is practically soluble in the solvent at a temperature above 120° C. However, as the temperature goes down, the copolymer becomes less and less soluble in the system forming a dispersion in a dispersion which could be advantageous for coating purposes.

Although specific ingredients ranges and proportions have been disclosed in the description of the preferred embodiments of the present invention, other well known and equivalent materials as listed above, where suitable, may be used with similar result. In addition, other well known additives may be incorporated in the compositions of the present invention to synergize, enhance, or otherwise modify the properties of the compositions. It will be appararent, therefore, that various changes and modifications can be made in the details of formulation, procedure and use without departing from the spirit of the present invention, said invention to be limited only as defined by the scope of the appended claims.

What is claimed is:

1. A liquid toner composition for use in electrostatic printing having no dispersing agent for maintaining polymeric material as discrete particles, comprising:

a stable non-aqueous dispersion of a random copolymer having a molecular weight between 80,000 and 500,000 and comprised of a low molecular weight unsaturated ester selected from the group consisting of vinyl acetate, vinyl propionate, methyl acrylate, ethyl acrylate, methyl methacrylate, and ethyl methacrylate and at least one copolymerizable long chain $C_6$ to $C_{20}$ aliphatic ethylenically unsaturated monomer selected from the group consisting of long chain acrylic, methacrylic and vinyl esters, the ratio of said low molecular weight ester to said long chain monomer being from 95:5 to 50:50 weight percent in an isoparaffinic hydrocarbon having a KB number between 25 and 30, an electrical resistivity of at least $10^9$ ohm centimeters, a 2. The composition of claim 1 wherein said surface active agent is selected from the group consisting of aluminum stearate, the cobalt, iron, manganese and zirconium salts of 2-ethyl hexanoic acid, and metal salts of napthenic acid, said metals being taken from the group consisting of manganese, cobalt, nickel, zinc, chromium, magnesium, lead, tin, zirconium, calcium and aluminum.

3. The composition of claim 1 wherein said low molecular weight unsaturated ester is vinyl acetate and said long chain $C_6$ to $C_{20}$ aliphatic ethylenically unsaturated monomer is lauryl methacrylate, said vinyl acetate and said lauryl methacrylate being present in a ratio of from about 95 to 5 to about 75 to 25 weight percent and about 0.001 to about 0.1 weight percent of the zirconium salt of 2-ethyl hexanoic acid based on the weight of said isoparaffinic hydrocarbon.

4. The composition of claim 1 wherein said low molecular weight unsaturated ester is vinyl acetate and said long chain $C_6$ to $C_{20}$ aliphatic ethylenically unsaturated monomer is stearyl methacrylate, said vinyl acetate and said stearyl methacrylate being present in a ratio of from about 95 to 5 to about 75 to 25 weight percent and about 0.001 to about 0.1 weight percent of the zirconium salt of 2-ethyl hexanoic acid based on the weight of said isoparaffinic hydrocarbon.

* * * * *

UNITED STATES PATENT AND TRADEMARK OFFICE
CERTIFICATE OF CORRECTION

PATENT NO. : 4,157,973

DATED : June 12, 1979

INVENTOR(S) : Jean P. Montillier

It is certified that error appears in the above—identified patent and that said Letters Patent are hereby corrected as shown below:

Column 8, line 53, change "appararent" to -- apparent --.

Column 9, line 10, after "a" insert -- dielectric constant of less than 3.5 and a TCC flash point of at least 100 degrees F, and a surface active agent. --.

Signed and Sealed this

Sixteenth Day of March 1982

[SEAL]

Attest:

Attesting Officer

GERALD J. MOSSINGHOFF

Commissioner of Patents and Trademarks